April 18, 1933.   C. W. BRISTOL ET AL   1,904,615
FITTING FOR MEASURING ELEMENTS
Filed Oct. 1, 1931
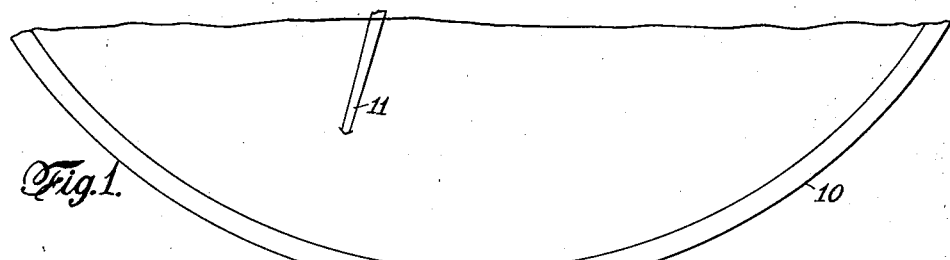
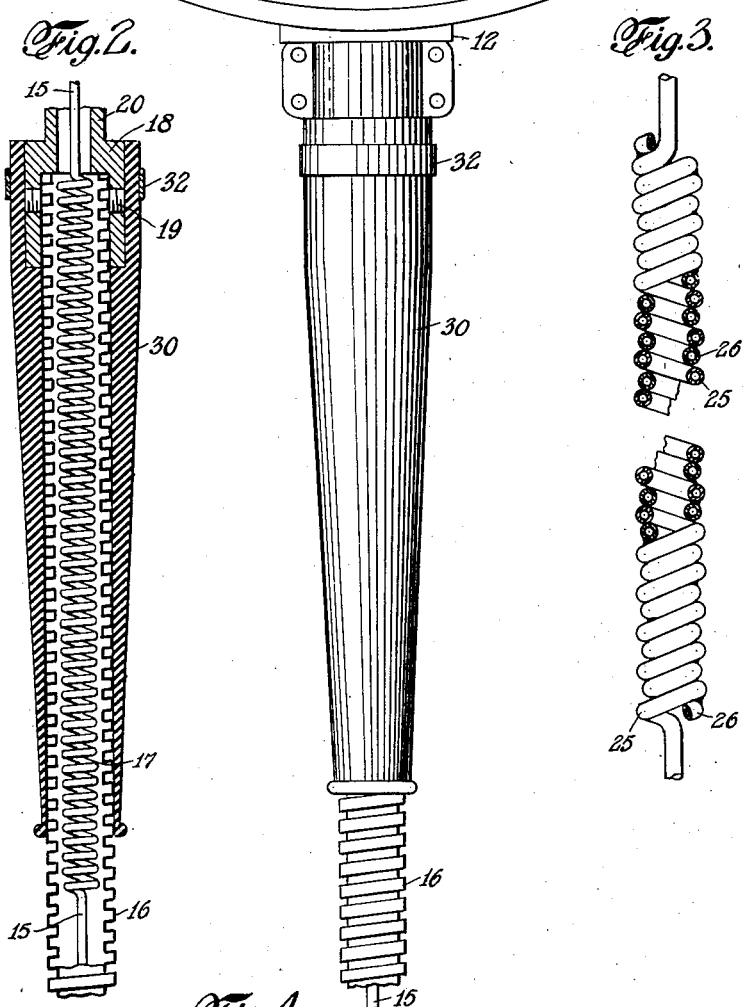
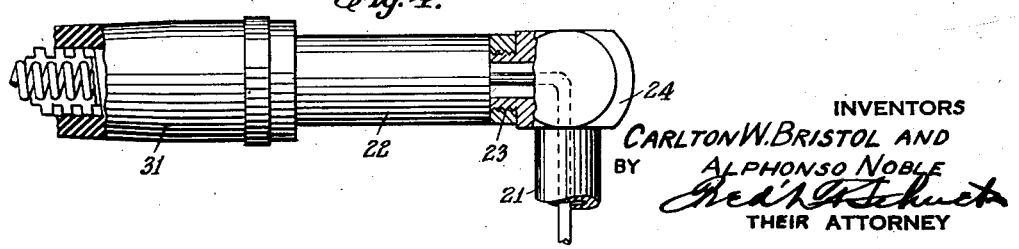
INVENTORS
CARLTON W. BRISTOL AND
ALPHONSO NOBLE
BY
THEIR ATTORNEY Patented Apr. 18, 1933

1,904,615

UNITED STATES PATENT OFFICE

CARLTON W. BRISTOL AND ALPHONSO NOBLE, OF NAUGATUCK, CONNECTICUT, ASSIGNORS TO THE BRISTOL COMPANY, OF WATERBURY, CONNECTICUT, A CORPORATION OF CONNECTICUT

FITTING FOR MEASURING ELEMENTS

Application filed October 1, 1931. Serial No. 566,246.

The invention relates to fittings for use with measuring elements or apparatus such as an indicating or recording instrument or the sensitive or responsive member or element connected therewith and adapted to be subjected to some changing condition, or with both; and the invention is concerned more especially with measuring systems utilizing a capillary tube or tubes which extend between the sensitive element and the measuring member, the said tube containing an expansible fluid, such as a gas, vapor or liquid.

It is the general practice in the use of these capillary tubes to provide about the same a protecting tube or armored cable which may be either of the flexible or solid bendable type. However, in the use of such protective means, and particularly in the case of a bulb or sensitive element which is frequently removed from the condition to be measured, there has been experienced difficulty in that the capillary tube or the armored cable, or both, break under frequent flexing, and as a rule at a point near the bulb or instrument end, as the case may be. Special elbow fittings and various expedients have been previously designed in an effort to obviate this difficulty, but without particular success.

It is an object of the present invention to provide a suitable protective arrangement at the junction ends of the capillary tube, or at an intermediate anchored portion of the armored tubing, and whereby the length of life thereof is greatly extended.

In carrying out the invention, the capillary tube is mounted as heretofore within an armored tubing, but at its anchored portions such as the ends proximate the measuring elements is coiled helically for an appreciable length. This allows of bending or frequent flexing of the armored tubing without damage to the retained capillary tube whose helical portion absorbs any twists or other stresses placed thereon by this action.

It is preferred, also, to insert between the convolutions of the coiled portion a spacer capillary tube which may be dead or, if preferred, live. In the latter instance, this affords additional capacity for the actuating fluid contained within the capillary tube. Furthermore, it is desirable that the enclosing armored tubing be of appreciably larger diameter than the diameter of the helical coil in order that the latter may have ample freedom of movement therein.

In addition, in order to limit the too-free bending of the armored tubing, it is desirable to reinforce the same at the anchored portions by means of a covering of resilient material in the nature of a sleeve applied thereover. This material may be of rubber and is arranged to be tapered with its larger end in proximity to the measuring elements, said end being secured in any desired manner to the tubing as by means of a metal ferrule or the like fitted thereover. By this expedient, it is impossible to bend sharply at this portion the armored tubing, and the radius of curvature to which the tubing (and capillary tube) may be bent is considerably increased as it approaches the anchored end thereof. Of course, in place of the rubber sleeve, other resilient means such as a tapered spring or the like might be substituted.

The nature of the invention, however, will best be understood when described in connection with the accompanying drawing, in which:

Fig. 1 is a fragmentary front elevation of a measuring instrument casing with the novel fitting secured thereto.

Fig. 2 is a longitudinal section through the fitting.

Fig. 3 is an elevation and part longitudinal section illustrating a modification in the arrangement of the capillary tube portion.

Fig. 4 is an elevation with portion broken away illustrating the fitting as applied to a thermo-sensitive element.

Referring to the drawing, 10 designates an instrument casing such as the usual casings housing measuring or recording mechanism for actuating a pointer arm or recording pen 11. A clamping bracket 12 of the casing 10 serves to secure the novel fitting to said casing for introducing to its measuring mechanism (not shown) a capillary tube 15. This tube is designed to retain an expansible fluid, either gaseous or liquid, and in communication with a sensitive or responsive element (not shown) for subjecting the liquid of the capillary tube to a condition to be measured by the measuring instrument, all of which is well understood and forms no particular part of the present invention.

The present invention is concerned more especially with a novel fitting member for protecting the capillary tube at its connection point with the instrument or the sensitive element, or both, as well as at any other portion where the tubing may be anchored and the capillary tube subject to frequent flexing. It is the general practice in the use of these capillary tubes to provide about the same substantial protective means such as flexible armored cable tubing 16; or, tubing of a solid, but bendable, type may be utilized for the purpose. While such tubing obviates contact with the retained capillary tube 15, it has been found that in the use of the instrument, more especially in the case where a sensitive element is frequently removed from the condition to which it is exposed, difficulty is experienced in that a capillary tube or the armored cable, or both, break at a point near their connection or anchorage to such element or instrument. In order to avoid this breakage, the capillary tube at its portion in proximity to the connection to the measuring element is helically coiled for an appreciable length to afford the helix 17 which is carried substantially to the end of the armored protective tubing surrounding the same and somewhat within the anchored end thereof.

The diameter of this tubing, moreover, is appreciably larger than the diameter of the helix 17 in order to provide a surrounding chamber therefor in which said helix may freely move, and the said helix will thus accommodate itself to ordinary twists and stresses placed thereon in the use of the measuring elements. In connecting the armored cable end to the instrument 10, for example, a bushing 18 may be secured to its free end by means of the set screws 19, said bushing having an extension 20 of reduced diameter to fit within the clamping bracket 12 and to be anchored securely thereby to the instrument casing 10.

Or, when the attachment is to a thermo-sensitive element or the like, indicated at 21, Fig. 4, the outer end of the bushing member 22 may be externally threaded, as indicated at 23, to screw within a suitable union or like member 24 carrying the bulb or sensitive member 21.

We have found that it is preferable to construct the helix with its convolutions in contact; or, the extent of flexure and consequent fatigue of the individual convolution of the helix may be reduced and its breakage resistance enhanced by introducing between the respective convolutions 25, Fig. 3, spacer convolutions 26 of an additional helix coaxially held thereto as by being soldered thereto at intervals along its length. This additional helix may be continued over substantially the entire length of the helix embodying the convolutions 25 and may be merely a dead helix or, if desired, may constitute a supplementary live capillary tubing for increasing the capacity of the expansible fluid, in which case, of course, the additional capillary tubing is continued to the opposite ends of the first-named capillary tubing connected in the same manner to the sensitive element and measuring instrument.

We have found, furthermore, that it is desirable to reinforce the portion of the armored tubing surrounding the helically coiled capillary tube by means of a sleeve of flexible or resilient material. For example, a rubber sleeve 30 may be tightly fitted over the portion of the tubing proximate the casing and similarly a portion 31 over the portion proximate the sensitive element. This sleeve is also tapered, the heavier portion thereof being located in proximity to the anchored end and is securely held to the attachment bushing by means of a metal ferrule 32 surrounding the said end. By this expedient, the tightly fitting sleeve, which may also be cemented to the armored tubing if desired, restricts the free bending of the tubing so that the latter may not bend sharply; and it serves, moreover, to increase the radius of curvature of the capillary tube as it approaches the fixed end of the fitting. Thus, it is impossible to bend the tubing sharply which might result in injury to the retained capillary tube as well as the said tubing itself.

We claim:

1. The combination with an anchoring support, of a flexible armor tubing having a portion adapted for the attachment thereto, and a capillary tube within the tubing helically coiled over a length proximate the attached portion.

2. A flexible armor tubing containing a capillary tube, and a connector secured to said flexible armor tubing for anchoring the same to a fixed support, the capillary tube at the connector being helically coiled for an appreciable length.

3. The combination with a measuring element, of a flexible armor tubing having an end adapted for attachment thereto, and a capillary tube within the tubing helically coiled over a length proximate the said tubing end and connected to the measuring element.

4. The combination with an anchoring support, of a flexible armor tubing adapted for attachment thereto, and a capillary tube passing through the tubing, said capillary tube being helically coiled over a length proximate the attached portion of the tubing.

5. The combination with a measuring element, of a flexible armor tubing adapted for attachment thereto, and a capillary tube passing through the tubing, said capillary tube being helically coiled over a length proximate the measuring element end of the tubing.

6. The combination with a measuring element, of a flexible armor tubing adapted for attachment thereto, and a capillary tube passing through the tubing, said capillary tube being coiled along its length in a plane perpendicular to the axis of the tubing and in proximity to the measuring element end thereof.

7. The combination with an anchoring support, of a flexible armor tubing having a portion adapted for attachment thereto, a capillary tube within the tubing, helically coiled over a length proximate the said attached portion, and a spacer capillary tube between the convolutions of the first-named capillary tube.

8. The combination with an anchoring support, of a flexible armor tubing adapted for attachment thereto, and a capillary tube passing through the tubing, said capillary tube being helically coiled along its length in a plane perpendicular to the axis of the tubing in proximity to the attached portion, and the tubing being of substantially greater diameter than the coil portion to allow of freedom of movement of the latter within the former.

9. The combination with an anchoring support, of a flexible armor tubing adapted for attachment thereto, a capillary tube passing through the tubing, said capillary tube being helically coiled over a length proximate the attached portion of the tubing, and a tapered sleeve of elastic material fitted over the flexible tubing portion substantially the length of the retained coiled capillary tube portion, with the larger end of the sleeve adapted for fixed attachment to the portion of the flexible armor tubing adapted for attachment to the anchoring support.

10. The combination with an anchoring support, of a flexible armor tubing adapted for attachment thereto, a capillary tube passing through the tubing, said capillary tube being helically coiled over a length proximate the attached portion of the tubing, a tapered sleeve of rubber fitted over the flexible tubing portion substantially the length of the retained coiled capillary tube portion, and means to fixedly secure the larger end of the tapered sleeve to the portion of the flexible armor tubing adapted for attachment to the anchoring support.

11. The combination with an anchoring support, of a flexible armor tubing adapted for attachment thereto, a capillary tube passing through the tubing, said capillary tube being helically coiled over a length proximate the attached portion of the tubing, a tapered sleeve of elastic material fitted over the flexible tubing portion substantially the length of the retained coiled capillary tube portion, and a metal ferrule fitting over the larger end of the sleeve.

In testimony whereof we affix our signatures.

CARLTON W. BRISTOL.
ALPHONSO NOBLE.